United States Patent
Taylor

(10) Patent No.: US 6,642,464 B1
(45) Date of Patent: *Nov. 4, 2003

(54) METHOD FOR OPERATING REMOTE ELECTRICAL DISTRIBUTION EQUIPMENT WITH TRANSITIONAL LIGHT-EMITIVE MEMBER DISPOSED INTERMEDIATE AN ELONGATE MEMBER AND A TOOL

(75) Inventor: David G. Taylor, Thomasville, GA (US)

(73) Assignee: Taylor-Maddox Technical, Inc., Thomasville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/277,713

(22) Filed: Oct. 21, 2002

Related U.S. Application Data

(63) Continuation of application No. 09/885,363, filed on Jun. 20, 2001, now Pat. No. 6,483,060.

(51) Int. Cl.[7] .......................... F16C 11/00; H01H 33/04
(52) U.S. Cl. ...................... 200/331; 200/17 R; 81/53.1; 403/97
(58) Field of Search .................. 81/38, 53.1; 200/17 R, 200/50.1, 330, 331; 218/1, 12; 294/19.1, 19.3, 24, 26; 337/156, 168, 171, 174–176, 194, 202, 203, 208, 211–214, 417; 438/476.1, 480, 477, 478, 483, 484; 403/109, 328, 377–379, 97

(56) References Cited

U.S. PATENT DOCUMENTS

| | | | |
|---|---|---|---|
| 785,744 A | 3/1905 | Strehlow | |
| 1,875,376 A | 9/1932 | Hamer et al. | |
| 2,278,111 A | 3/1942 | Kleinpell | 240/6.46 |
| 2,543,862 A | 3/1951 | Manahan | 294/19 |
| 2,720,410 A | 10/1955 | Smith | 294/19 |
| 2,824,190 A | 2/1958 | Mikos | 200/114 |
| 3,182,960 A | 5/1965 | French | 254/134.7 |
| 3,866,965 A | 2/1975 | Homeier | 294/19 R |
| 4,864,899 A | 9/1989 | Morse | 81/53.11 |
| 5,564,852 A | 10/1996 | Maxwell et al. | 403/97 |
| 5,742,220 A | 4/1998 | Scherer | 337/171 |
| 5,773,777 A | 6/1998 | Scherer | 218/7 |
| 5,861,595 A | 1/1999 | Wood et al. | 218/12 |
| 5,998,748 A | 12/1999 | Taylor | 200/331 |
| 6,483,060 B1 * | 11/2002 | Taylor | 200/331 |

OTHER PUBLICATIONS

Hastings, Hot Line Tools & Equipment, pp. A1–A6, B1–B10–1, F1–F6 (various dates).

* cited by examiner

*Primary Examiner*—M. Friedhofer
(74) *Attorney, Agent, or Firm*—Baker, Donelson, Bearman, Caldwell & Berkowitz

(57) ABSTRACT

A method for moving operational catches on electrical distribution equipment mounted on poles of an electrical distribution system with a tool connected to a transitional member attached to an end of the pole, in which the transitional member connects at a first angle relative to the elongate member and at a second angle relative to the tool, with a light source in the transitional member oriented at an oblique angle for simultaneously illuminating a work area of the electrical distribution equipment and the tool, whereby the tool is illuminable by the light source even though the intermediate member is placed selectively in differing orientations relative to the elongate member.

5 Claims, 1 Drawing Sheet

METHOD FOR OPERATING REMOTE ELECTRICAL DISTRIBUTION EQUIPMENT WITH TRANSITIONAL LIGHT-EMITIVE MEMBER DISPOSED INTERMEDIATE AN ELONGATE MEMBER AND A TOOL

The present application is a continuation of application Ser. No. 09/885,363, filed Jun. 20, 2001 now U.S. Pat. No. 6,483,060.

TECHNICAL FIELD

The present invention relates to actuators for operating electrical distribution equipment mounted on poles of electrical distribution systems. More particularly, the present invention relates to tips engaged to distal ends of elongate members for operating remote electrical distribution equipment mounted on poles of electrical distribution systems.

BACKGROUND OF THE INVENTION

Electrical transmission and distribution systems typically use a number of poles mounted along roadsides and other right-of-way for supporting electric lines. Electrical current transmits through the electric lines from generation stations for distribution to commercial and residential customers. Many of the poles include electrical distribution equipment for use controlling the transmission of electric current. These electrical distribution equipment include interrupt assemblies and transformers. The interrupt assemblies are typically reclosers, fuses, and cut-out switches. The interrupt assemblies are used to interrupt a transmission of electricity through the electric lines. Primarily, the interrupt assemblies function to isolate portions of the transmission lines in the event of electrical surges. For example, some types of reclosers operate automatically under high current surges such as are caused by electrical storms. The opening and closing of the recloser prevents the surge from communicating further through the transmission and distribution system. The recloser thereby electrically protects the transmission and distribution system from damage. Similarly, fuses open or "blow" in order to protect the transmission lines from damage.

If a recloser fails to open (i.e., properly operate), or a fuse is blown open, portions of the distribution system are isolated from electrical current. Line technicians must travel to the open recloser or blown fuse and close the recloser or replace the fuse to reestablish electrical current to the isolated portion of the distribution system.

One such interrupting assembly is a vertically mounted cut-out assembly. The cut-out assembly mounts in line with the electrical lines, transformers, capacitors, regulators and the like. When the cut-out assembly is open, electrical current does not flow through the assembly to the line or apparatus downstream of the assembly. Vertical cut-outs include a combined switch and fuse element. The combined switch and lightning arrestor fuse element pivotally mounts at one end in a hinge bracket. The pivot is usually located at the lower end of the vertical cutout. At the opposing end, the switch has a cap which engages a recess of a contact plate in the assembly. The recess engages the cap, typically under spring pressure. The spring pressure secures the switch in an operative position, whereby electrical current communicates through the cut-out assembly. Detaching the cap from the contact plate opens the cut-out assembly and thereby stops the electrical communication through the assembly. The switch pivots with a respect to the lower hinge bracket to a "drop-out" position. Often the cut-out combined switch and fuse element moves automatically to the drop-out position by disengaging from the contact plate after the fuse opens or blows. In addition to automatic operation, these devices may be operated manually by linesmen to interrupt the electrical circuit, whereby work can be carried out more safely on the isolated portion of the transmission system. With the combined switch and fuse element in the drop-out position, the element can be lifted from the assembly by engaging ears on the element and brought to the ground for servicing. A ring at an opposing end of the element is engageable to pivot the element from the drop-out position to the engaged operating position The interrupting assemblies are typically fitted with a structural feature designed for cooperation with a handling tool, commonly referred to as a extendostick. These handheld extendosticks are typically 30 to 40 feet, or more, in length. The extendostick is operated typically by a utility worker or lineman who is standing on the ground near the pole, although other operating tools maybe used by the lineman who has climbed the pole to be near the electrical distribution equipment, or is standing in a platform of a bucket truck. For example, my U.S. Pat. No. 5,998,748 describes a lever arm which readily attaches to rings connected to reclosers. The typical structural feature of a recloser that the extendostick engages to operate the equipment is a ring that extends from the end of an arm operatively engaged to the recloser. The lineman inserts the hook stick into the ring, and using the hook stick, actuates the equipment by pressing or pulling against the ring with the hook stick. Rings operated by hook sticks are difficult and cumbersome to operate. Inserting the free distal end of the hook stick into the typical ring from the ground requires skill and patience. The difficulty of inserting the hook stick into the ring is further complicated by the conditions in which electrical system faults generally occur. High winds and lightening are leading causes of system faults. Therefore, the need to operate a cut-out switch often occurs during poor weather and at night. Placing the hook stick into the relatively small ring near an upper portion of a utility pole is even more an arduous a task in wet, windy, and dark conditions. This is a difficult task, even for such electrical distribution devices known as cut-out switches that use rings or hooks for the operational catches that are engaged by the extendosticks. These factors may cause numerous failed attempts to place the hook stick into the ring, and work becomes time consuming. Time is important in restoring electrical power to isolated portions of the transmission system. Moreover, safety of utility personal has a significant concern. Failed attempts to inset a hook stick into a pole ring increases the exposure of the lineman to weather conditions or electrical hazards.

Accordingly, there is a need in the art for an improved tip for attachment to a distal end of a extendostick to facilitate operation of electrical distribution equipment mounted to poles of electrical distribution systems. It is to such that the present invention is directed.

BRIEF SUMMARY OF THE PRESENT INVENTION

The present invention meets the need in the art by providing a method of operating a catch on electrical distribution equipment mounted on poles of an electrical distribution system with a transitional member having a light source attached intermediate a distal end of an elongate member and a tool for selectively simultaneously illuminating, engaging, and operating the catch remote from the ground, comprising the steps of:

(a) connecting a body having a first connecter that defines a surface of a first character with a mating surface of a second character defined on a distal end of an elongate member at a first angle relative to a longitudinal axis of the elongate member;

(b) connecting a tool for selectively engaging an operational catch on electrical distribution equipment to a second connector in a portion of the body opposing the first connector at a second angle relative to the longitudinal axis of the elongate member, the second connector defining a surface of a third character that matingly engages a surface of the tool defining a fourth character;

(c) activating a light source having a power supply and light bulb enclosed within the body intermediate the first connector and the second connector with a light-emitting end oriented at an oblique angle relative to the second connector for simultaneously illuminating a work area of the electrical distribution equipment and the tool, whereby the tool is illuminable by the light source even though the first connector is placed selectively in differing orientations relative to the elongate member; and (d) moving the elongate member selectively to engage the tool in the operational catch of the electrical distribution equipment for operation thereof, whereby the body and the elongate member and the body and the tool, being selectively engaged at the respective first and second angles, allows an operator simultaneously to illuminate the work area and to observe the tool and the operational catch for selectively moving the elongate member to engage and operate the operational catch with the tool.

Other objects, advantages, and features of the present invention will become apparent upon a reading of the following detailed description of the invention and claims in view of the appended drawings.

DETAILED DESCRIPTION OF THE PRESENT INVENTION

Figure 1:
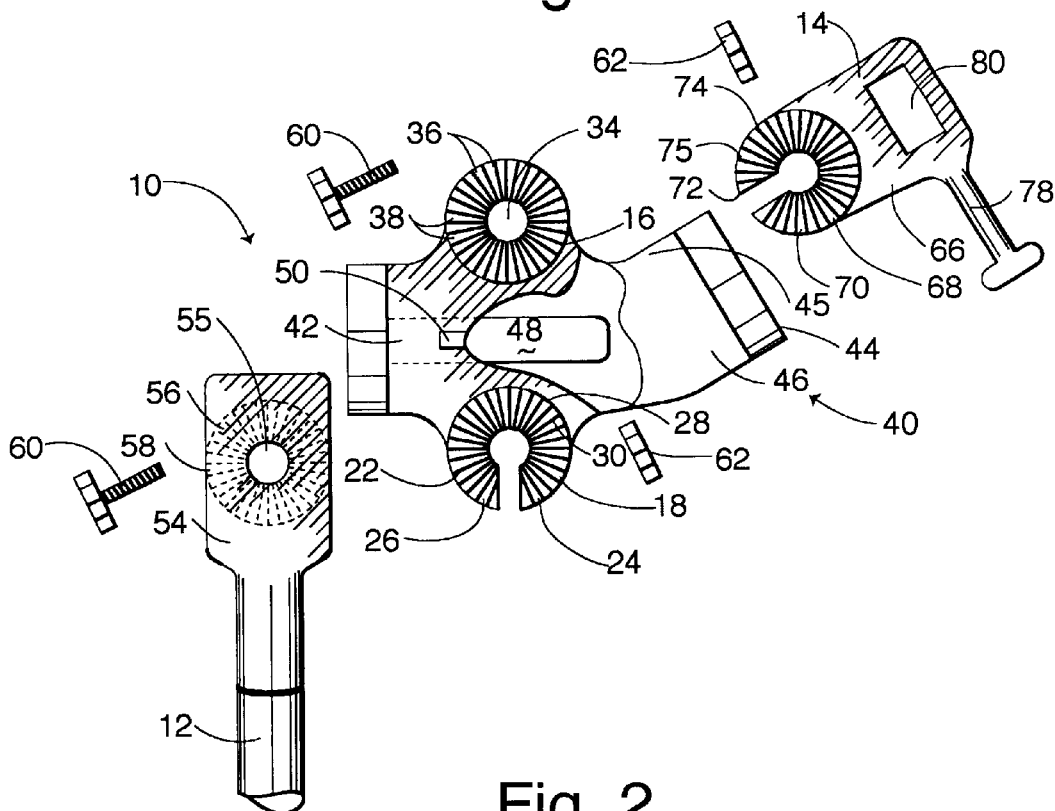
FIG. 1 is a plan view, exploded and partially cut-away, of a transitional member with an elongate member and operating tool in accordance with the present invention.

Referring now in more detail to the drawings in which like parts have like identifiers, FIG. 1 is a plan view, exploded and partially cut-away, of a transitional member 10 for attaching at a first angle between a distal end of a hook stick or elongate member 12 and a tool or tip 14, for orienting the tip 14 at a second angle relative to the elongate member, as discussed below. In the illustrated embodiment, the tip 14 is configured for operating electrical distribution equipment mounted on power poles in an electrical distribution system. The transitional member 10 comprises a body 16 having a first connector 18 for engaging a distal end of the elongate member 12. In the illustrated embodiment, the first connector 18 comprises a pair of arms 22, 24 that extend from the body 16 in a first direction to define a slot 26. As discussed below, a fastener passes through the slot 26 for securing the transitional member 10 to the elongate member 12. The first connector 18 defines a surface of a first character for engagement with a surface of a mating second character on the elongate member 12. In the illustrated embodiment, the arms 22, 24 include a plurality of raised, radially disposed ridges 28. The ridges 28 are spaced-apart to define valleys 30 between adjacent ridges 28, for a purpose discussed below.

A portion of the body 16 opposing the first connector 18 defines a second connector generally 32. The second connector 32 includes an opening 34 and the body 16 thereat defines a surface of a third character for engagement with a mating surface of the tip 14. In the illustrated embodiment, the second connector 32 defines an annular pattern of ridges 36 and valleys 38 around the opening 34.

The transitional member 10 in the illustrated embodiment further includes an integral light source 40. The body 16 defines a cylindrical cavity 42 disposed between the first connector 18 and the second connector 32. The cylindrical cavity 42 is closed by a transparent cover 44 which encloses a conventional light bulb (not illustrated) at a side portion 45 of the body 16. In the illustrated embodiment, the light bulb and transparent cover 44 are disposed at a distal end of a projecting member 46. The projecting member is disposed at an oblique angle relative to a longitudinal axis of the cavity 42, to thereby angle the orientation of the beam of light emitted from through the cover 44 in first direction. The cavity 42 is sized for receiving a battery 48. The cavity 42 includes wires for engaging electrically opposing ends of a battery received within the cavity. The distal ends of the wires electrically communicate with the light bulb. A switch 50 electrically communicates with one of the wires between the battery 48 and the light bulb to enable the light bulb to be selectively operated. A cap 52 threadably engages an open end of the cavity 42 on the body 16 opposing the cover 44.

As illustrated in FIG. 1, the elongate member 12 receives a connector plate 54 at a distal end. The connector plate 54 defines an opening 55. A face of the plate 54 defines a plurality of raised ridges 56 separated by valleys 58 that correspond to the ridges 28 and valleys 30 of the first connector 18 of the transitional member 10. The plate 54 matingly engages the connector 18 with the ridges 28 received in the valleys 58 of the plate and the valleys 30 of the connector 18 receiving the ridges 56 of the plate. Depending upon the selective placement of the first connector 18 of the transitional member 10 relative to the connector plate 54, the transitional member 10 is selectively positioned at a first angle relative to a longitudinal axis of the elongate member 12. A threaded fastener 60 extends through the opening 55, through the slot 26, and engages a nut 62 for securing the transitional member 10 in the selected position.

Further illustrated in FIG. 1 is the tip 14 for attachment to the transitional member 10, to provide a tool for operating electrical distribution equipment mounted on poles of an electrical distribution system, as discussed below. The tip 14 in the illustrated embodiment includes a body 66 having a connector 68 with two arms 70, 72 and a surface that defines an arcuate pattern of ridges 74 and valleys 76, for mating engagement to the second connector 32 of the transitional member 10. An arm 78 extends laterally from a side portion of the body 66 opposing the connector 68. In the illustrated embodiment, the body 66 further defines an opening 80 opposing the connector 68. The opening 80 and the arm 78 provide engagement portions of the tip 14 for engaging operative elements of the electrical distribution equipment, as discussed below.

The present invention accordingly provides the transitional member 10 for readily attaching at the first angle to the elongate member 12 with the tip 14 disposed at a second angle for engaging and operating electrical distribution equipment mounted on poles remote from the ground. The transitional member 10 preferably is molded from a high strength plastic, fiberglass, or other non-conductive material. The transitional member 10 matingly engages the plate 54 by aligning the respective ridges 28 and valleys 30 with the valleys 58 and ridges 56, respectively, on the plate 54. The transitional member 10 is thereby selectively positioned at an angle relative to the longitudinal axis of the elongate member 12. The transitional member 10 is secured to the plate 40 by the threaded fastener 60 and nut 62. It is to be appreciated that the plate 54 can be configured as an integral portion of the elongate member 12, or as a separate member selectively attached to the distal end of the elongate member or hook stick.

The tip 14 similarly attaches to the second connector 32 of the transitional member 10. The ridges 74 and valleys 76 of the connector 68 are selectively positioned to the valleys 38 and the ridges 36 of the second connector 32, whereby the tip 14 is selectively oriented at a second angle relative to the longitudinal axis of the elongate member 12. The tip 14 is secured to the transitional member 10 by one of the threaded fasteners 60 and nuts 62.

Figure 2:
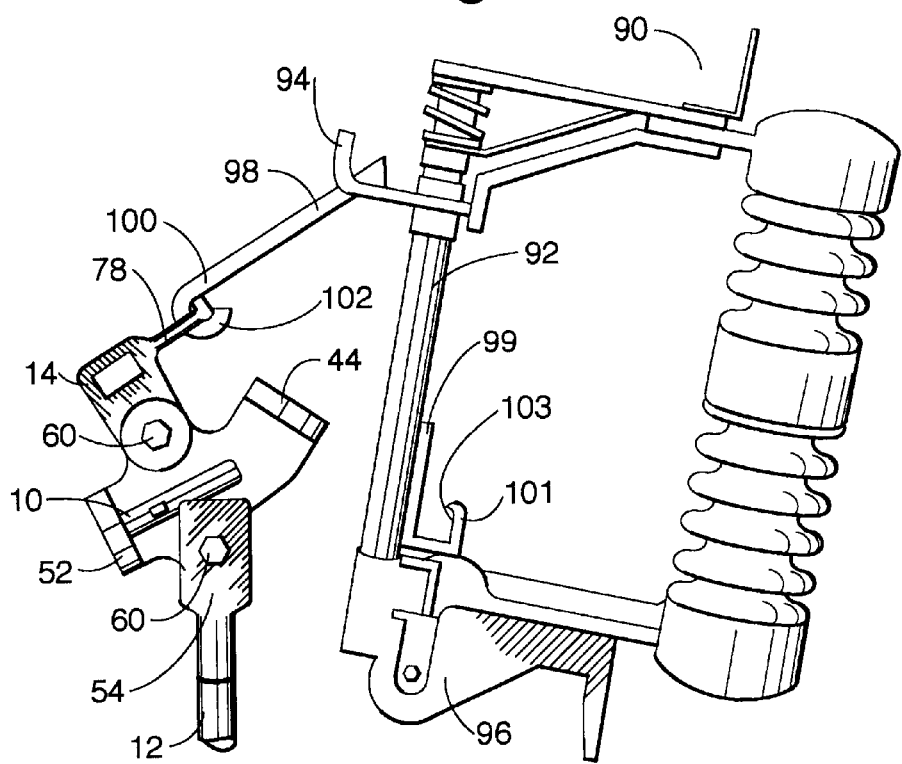
FIG. 2 is a side view of a cut-out and arrester combination with hooks for operation by a tip connected with the transitional member shown in FIG. 1 to an elongate member, according to the present invention.

FIG. 2 illustrates a cut-out and arrester combination 90 also known as a lock-out switch or fused cut-out switch. This one of the types of electrical distribution equipment typically mounted on poles remote from the ground for controlling the transmission of electrical current through electrical lines in a transmission and distribution system. The cut-out and arrester combination 90 includes a fuse body 92 detachably engaged to supports 94, 96. Opposing hooks 98, 99 attach to end portions of the fuse body 92. The hooks 98, 99 each have an arm 100, 101 with respective hook-shaped distal ends 102, 103. Conventionally, the fuse body 92 pivotally connects to the hinge-like support 96 in the cut-out and arrester combination 90 disposed closer to the ground. The fuse body 92 is engaged by a clip at the support 94. With the use of a hookstick or elongate member 12, the hook 98 is engaged and moved, to detach the fuse body 92 from the support 94, for maintenance and repair purposes.

The transitional member 10 of the present invention is illustrated engaged at the first angle to the elongate member 12 with the tip 14 engaged at the second angle to the second connector 32 of the transitional member 10 for engaging the hook 98 at the operational catch of the cutout and arrester combination 90.

In use, the transitional member 10 attaches to the elongate member 12 at the first connector 24, and the tip 14 (or another tool) attaches to the transitional member 10 at the second connector 32, in the manner discussed above. The light bulb in the light source 40 emits light through the cover 44, upon selective activation with the switch 50. The elongate member 12 is extended so that tip 14 can be raised near the electrical distribution equipment 90 on a pole remote from the ground. This provides lighting at the work area remote from the ground where the linesman is handling the elongate member 12. Operational catches, such as the hooks 98, 99 in the illustrated cut-out 90, attached to the electrical distribution equipment are readily engaged in the opening 80 or the arm 78 of the tip 14. As illustrated in FIG. 2, the arm 78 extends through the hook 98. Movement of the elongate member 12 causes the fuse body 92 on the electrical distribution equipment to be moved and thereby detach from the clips in the upper support 94. If the fuse element within the fuse body 92 is blown, the fuse body is removed from the hinge at the support 96 by engaging the hook 99. The fuse body 92 is lowered to the ground, and the fuse element is replaced. The tip 14 is then used to engage the hook 99 to replace the fuse body 92 on the support 96. The tip 14 then is engaged by the arm 78 or the opening 80 to the hook 98 to pivotingly move the fuse body 92 into engagement with the upper support 94. The transitional member 10 and the tip 14 are independently and selectively oriented at the first and second angles relative to the elongate member 12, to facilitate accessing the electrical distribution equipment remote from the ground, for isolating portions of an electrical distribution system, for repair or servicing, with light provided by the light source 40 and for re-energizing the section of the distribution system afterward.

It is to be appreciated that the transitional member 10 is readily usable with a hookstick for light-emitting purposes by a linesman while working on remote electrical distribution equipment without a separate tool attached to the second connector 32. For example, a linesman may need supplemental or additional lighting, which is provided by the use of another of the transitional member 10 attached to another hookstick or elongate member 12. In the alternative, several of the transitional members 10 can be attached together in series at different angles relative to the longitudinal axis of the hookstick, with an operational tool placed on the distal transitional member at a selected other angle. An alternate embodiment (not illustrated) of the transitional member 10 is readily used intermediate the hookstick or elongate member 12 and the tool (such as the tip 14) without incorporating the light source 40 therein. This embodiment provides selected orientation of the tool with the more than one selected angle of the tool and the transitional member for positioning the tool to access a difficult to reach operation catch of an electrical distribution device.

The intermediate member 10 is readily fabricated or manufactured, such as by molding or casting, and preferably using non-electrically conductive materials, such as a plastic or other suitable material. The present invention accordingly provides a transitional member that readily mounts to the distal end of an elongate pole at a selected angle for providing illumination to a work area on electrical distribution equipment remote from the linesman working on the equipment while providing a connector for a tool or tip 14 that attaches at a second selective angle for engaging and operating switches on electrical distribution equipment mounted on poles. While the invention has been described in detail with particular reference to the preferred embodiment thereof, the principles and modes of operation of the present invention have been described in the foregoing specification. The invention is not to be construed as limited to the particular forms disclosed because these are regarded as illustrative rather than restrictive. Moreover, modifications, variations, and changes may be made by those skilled in the art without departure from the sprit and scope of the invention as described by the following claims.

What is claimed is:

1. A method of operating a catch on electrical distribution equipment mounted on poles of an electrical distribution system with an illuminative transitional member attached intermediate a distal end of an elongate member and a tool for selectively simultaneously illuminating, engaging, and operating the catch remote from the ground, comprising the steps of:

(a) connecting a body having a first connecter that defines a surface of a first character with a mating surface of a second character defined on a distal end of an elongate member at a first angle relative to a longitudinal axis of the elongate member;

(b) connecting a tool for selectively engaging an operational catch on electrical distribution equipment to a second connector in a portion of the body opposing the first connector at a second angle relative to the longitudinal axis of the elongate member, the second connector defining a surface of a third character that matingly engages a surface of the tool defining a fourth character;

(c) activating a light source having a power supply and light bulb enclosed within the body intermediate the first connector and the second connector with a light-emitting end oriented at an oblique angle relative to the second connector for simultaneously illuminating a work area of the electrical distribution equipment and the tool, whereby the tool is illuminable by the light source even though the first connector is placed selectively in differing orientations relative to the elongate member; and (d) moving the elongate member selectively to engage the tool in the operational catch of the electrical distribution equipment for operation thereof, whereby the body and the elongate member and the body and the tool, being selectively engaged at the respective first and second angles, allows an operator simultaneously to illuminate the work area and to observe the tool and the operational catch for selectively moving the elongate member to engage and operate the operational catch with the tool.

2. The method as recited in claim 1, wherein steps (a) and (b) connecting comprises engaging spaced-apart ridges and valleys defining the opposing first and second characters and the opposing third and fourth characters.

3. The method as recited in claim 2, further comprising the step of securing the elongate member and the body together with a fastener extending through a gap defined by a pair of spaced-apart members in the body and an opening in the mating surface of the second character defined on the distal end of the elongate member.

4. The method as recited in claim 1, wherein the step (d) moving causes a cantilever arm extending from the tool to engage a ring on the catch of the electrical distribution equipment for operation thereof.

5. The method as recited in claim 1, wherein the step (d) moving causes an opening defined in the tool to engage the catch on the electrical distribution equipment for operation thereof.

* * * * *